United States Patent [19]

Wijsboom

[11] 3,906,302
[45] Sept. 16, 1975

[54] ARRANGEMENT PROVIDED WITH A GAS AND/OR VAPOUR DISCHARGE LAMP

[75] Inventor: Dan Bernardus Wijsboom, Eindhoven, Netherlands

[73] Assignee: U.S. Philips Corporation, New York, N.Y.

[22] Filed: Jan. 8, 1973

[21] Appl. No.: 321,655

[30] Foreign Application Priority Data
Jan. 19, 1972 Netherlands.................... 7200720

[52] U.S. Cl................................. 315/209; 315/289
[51] Int. Cl.². ........................................ H05B 37/02
[58] Field of Search ........... 315/209, 105, 193, 225, 315/289

[56] References Cited
UNITED STATES PATENTS
3,315,124  4/1967  Boeker........................... 315/105 X
3,629,648  12/1971  Brown et al. .................... 315/105 X
3,701,925  10/1972  Nozawa et al. ................. 315/105 X

*Primary Examiner*—Nathan Kaufman
*Attorney, Agent, or Firm*—Frank R. Trifari; Bernard Franzblau

[57] ABSTRACT

The invention relates to an arrangement provided with a gas and/or vapour discharge lamp.

According to the invention the lamp is shunted by an inductor and is arranged in series with a transistor which is quickly rendered conducting and non-conducting in a repetitive manner. In this manner it is achieved that there is no cataphoresis in case of a direct voltage supply of this arrangement and that for an alternating voltage supply of this arrangement the ionisation in the lamp is maintained during the period when the transistor is non-conducting.

14 Claims, 3 Drawing Figures

PATENTED SEP 16 1975  3,906,302

ARRANGEMENT PROVIDED WITH A GAS AND/OR VAPOUR DISCHARGE LAMP

The invention relates to an arrangement provided with a gas and/or vapour discharge lamp and means for igniting and supplying said lamp including a switching element connected in series with the lamp, the series arrangement of at least the lamp and the switching element connecting two input terminals of the arrangement, a control device of the switching element in the switched-on condition of the arrangement rendering the switching element conducting at a minimum frequency of 400 times per second and subsequently rendering it nonconducting again, an inductor being present as well as a branch connected in parallel with the lamp.

A known arrangement of this kind is described, for example, in U.S. Pat. No. 3,265,930.

In the embodiments of the said United States Patent, which may be classified as arrangements of the kind described in the preamble, a distinction may be made for those cases where the switching element which forms part of the series arrangement comprising the lamp and connecting the input terminals is only suitable for current flow in one current direction and for cases where this switching element is suitable for bidirectional current flow.

A drawback of the said known case employing a switching element suitable for one current direction only is that the direction of the current flowing through the lamp during the period when the switching element is conducting is the same as the direction of the current flowing through the lamp during the period when the switching element is not conducting. This direct current drawback becomes manifest, for example, in an unequal attack on the lamp electrodes and in the case of discharge lamps including, for example, mercury or another metal, this drawback becomes manifest in an unwanted transport of this metal in the discharge space. This effect is referred to as cataphoresis.

A drawback of the known case in which a switching element suitable for two current directions is used is that a second periodically controlled switching element is required in the branch connected in parallel with the lamp.

An object of the invention is to provide an arrangement of the kind described in the preamble in which an alternating current flows through the lamp in its operating condition and in which the complication of an extra periodically controlled switching element in the branch connected in parallel with the lamp is avoided.

According to the invention an arrangement provided with a gas and/or vapour discharge lamp and means for igniting and supplying said lamp includes a switching element connected in series with the lamp, and in which the series arrangement of at least the lamp and the switching element connects two input terminals of the arrangement and in which a control device of the switching element in the switched-on condition of the arrangement renders the switching element conducting at a minimum frequency of 400 times per second and subsequently renders it non-conducting again thereby limiting the discharge lamp current without the usual series ballast, and in which an inductor is present as well as a branch connected in parallel with the lamp, is characterized in that the inductor is incorporated in the branch connected in parallel with the lamp and that a means is present for generating — at the instant of the switching element becoming non-conducting — a voltage across the lamp which voltage is at least equal to the re-ignition voltage of said lamp.

An advantage of an arrangement according to the invention is that the extent of cataphoresis can be reduced — or even reduced to zero — and that an extra periodically controlled switching element in the branch connected in parallel with the lamp is not required.

All this may be described in detail as follows. In an arrangement according to the invention a current flows through the lamp and also through the inductor connected in parallel therewith in the conducting condition of the switching element. When the switching element becomes non-conducting the current in the inductor attempts to be maintained so that a current starts to flow in the closed circuit of inductor and lamp, which current in the lamp has a direction which is opposite to that which previously flowed through the lamp when the switching element was still conducting.

The means to obtain a re-ignition of the lamp after the switching element has become non-conducting consists of, for example, an auxiliary circuit coupled to the control device of the switching element and applying an auxiliary voltage between the lamp electrodes for a short period of time.

The voltage for the re-ignition of the lamp is preferably generated in the inductor to which end the combination of the value of the inductance L of this inductor and of the current variation $di/dt$ of the current $i$ through this inductor at the moment the switching element becomes non-conducting is chosen such that the product $L \cdot di/dt$ is at least equal to the said re-ignition voltage of the lamp.

An advantage of this preferred embodiment is that separate auxiliary circuits for generating a voltage for the re-ignition of the lamp are not required. In the case of the preferred embodiment the re-ignition is realized by the voltage peak which is produced in the inductor when the switching element becomes non-conducting.

In a further preferred embodiment according to the invention, intended for connection to a direct voltage power supply, the inductance of the inductor is chosen so that the value of the product of the conductivity period of the switching element and the mean lamp current during the intervals of time when the switching element is conducting is between 0.8 times and 1.2 times the value of the product of the off-time of the switching element and the mean lamp current during the time intervals when the switching element is non-conducting.

An advantage of the latter preferred embodiment is that the electrodes of the lamp are evenly loaded and that cataphoresis is substantially eliminated because the lamp is substantially completely loaded symmetrically, i.e. the current per second in one direction is substantially equal to that in the other direction.

The discharge lamp may be, for example, a high-pressure sodium vapour discharge lamp.

In a further preferred embodiment the lamp is a low-pressure mercury vapour discharge lamp which is provided with two preheated electrodes in which the inductor is connected to the ends of the electrodes remote from the power supply.

An advantage of this embodiment is that the branch comprising the inductor can also be utilized during starting of the lamp for preheating the electrodes of the discharge lamp.

The switching element in series with the lamp is, for example, a thyristor or in the case of an alternating voltage supply it is a semiconductor switching element having a dual thyristor characteristic, also sometimes referred to as a triac. These semiconductor switching elements might be rendered non-conducting, for example, with the aid of a separate auxiliary extinction circuit.

In an arrangement according to the invention intended for connection to a direct voltage supply the switching element is preferably a transistor.

An advantage thereof is that a separate auxiliary extinction circuit is not required because the control of the base voltage of the transistor may render this switching element both conducting and non-conducting.

In the case of an alternating voltage supply the switching element may consist of, for example, two antiparallel arranged transistors one of which is used during one-half cycle of the AC supply and the other transistor of which is used during the next half cycle of the AC supply.

In a further preferred embodiment of an arrangement according to the invention intended for connection to an alternating voltage supply of approximately 40 to 60 Hz, the switching element consists of a rectifier bridge having a central branch including a transistor.

An advantage of this preferred embodiment is that the control of the switching element may be very simple.

In a last preferred embodiment in which the arrangement is intended to be connected to a power supply whose voltage is lower than the ignition voltage of the lamp, the inductance of the inductor and the value of $di/dt$ is chosen so that with the arrangement switched on but with the lamp not yet ignited, the voltage generated in the inductor becomes at least equal to the ignition voltage of the lamp when the switching element becomes non-conducting. An advantage thereof is that the inductor also ensures the first ignition of the lamp.

The invention will be described in detail with reference to the accompanying drawing in which.

Figure 1:
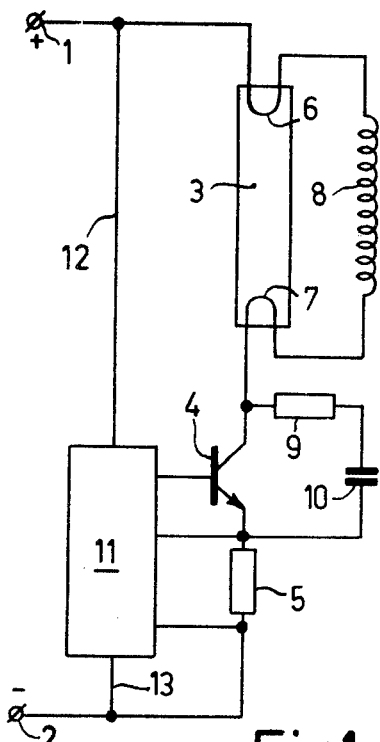
FIG. 1 shows an electric circuit diagram of a first arrangement according to the invention.

In FIG. 1, reference numerals 1 and 2 denote input terminals of the arrangement. Terminal 1 is connected to a positive terminal of a battery and terminal 2 is connected to the negative battery terminal. Terminal 1 is connected to terminal 2 by a series arrangement of a discharge lamp 3, a transistor 4 and a resistor 5. The lamp 3 is a low-pressure mercury vapour discharge lamp of approximately 40 Watts. This lamp is provided with preheated electrodes 6 and 7. The ends of the electrodes 6 and 7 remote from terminals 1 and 2 are connected together through an inductor 8. The transistor 4 is shunted by a series arrangement of an auxiliary resistor 9 and a capacitor 10. The base of transistor 4 is connected to a control device 11. The two terminals of the resistor 5 also are connected to the control device 11. The components 9 and 10 serve to safeguard the transistor 4 from excessively high voltages. The voltage across resistor 5 influences the on-time of the transistor 4 through the control device 11 so that the currents through the lamp 3 can be approximately maintained constant.

The operation of the circuit of FIG. 1 is as follows. When the terminals 1 and 2 are connected to the direct current source and when the control device is put into operation through the conductors 12 and 13, a current flows from terminal 1 through electrode 6, inductor 8, electrode 7, transistor 4 and resistor 5 to terminal 2 during the periods when transistor 4 conducts. This current heats the electrodes 6 and 7. When transistor 4 is cut-off a voltage peak is induced in the inductor 8, which peak is present between the electrodes 6 and 7. When these electrodes are pre-heated sufficiently after some time, a subsequent voltage peak is sufficient for the lamp 3 to be ignited. Subsequently currents will flow through the lamp 3 and the inductor 8 in the conducting condition of transistor 4, which currents have the same direction. However, when transistor 4 becomes non-conducting the current in inductor 8 will attempt to be maintained so that a current starts to flow in the closed circuit constituted by the inductor 8 and the lamp 3. The latter current flows in the lamp 3 in a direction which is opposite to the direction of the current in the lamp in the conducting condition of transistor 4.

In one embodiment the voltage between terminals 1 and 2 was approximately 130 Volts. The ignition voltage of the lamp 3 was approximately 260 Volts. The operating voltage of the lamp 3 was approximately 130 Volts in the conducting condition of the transistor and had a mean value of 100 Volts in the non-conducting condition of the transistor. The inductance of the inductor 8 was approximately 8 m Henry. The transistor 4 was controlled at a frequency of approximately 12.5 kHz and with a ratio between the operative and the inoperative period of 3 to 5 on average. In that embodiment the voltage peaks generated by the coil 8 were both larger than the ignition voltage of the lamp 3 and larger than the re-ignition voltage of the lamp 3. The re-ignition voltage of the lamp 3 was approximately 190 Volts in the non-conducting condition of the transistor. In the case of FIG. 1 the product of lamp current (during the conducting period of the transistor) multiplied by the on-time of the transistor was approximately 560 mA × 30 $\mu$ seconds. This was substantially equal to the product of the lamp current during the off-time of the transistor multiplied by the off-time of the transistor, namely approximately 335 mA × 50 $\mu$ seconds.

Figure 2:
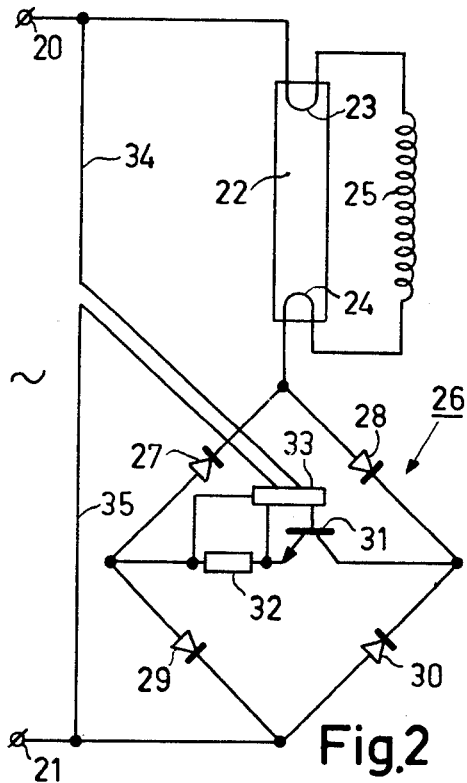
FIG. 2 shows an electric circuit diagram of a second arrangement according to the invention.

In FIG. 2, connection terminals 20 and 21 are intended to be connected to an alternating voltage source of approximately 220 Volts, 50 Hz. A low-pressure mercury vapour discharge lamp 22 is provided with pre-heated electrodes 23 and 24. The ends of the electrodes 23 and 24 remote from the supply terminals 20 and 21 are connected together through an inductor 25. Furthermore the electrode 24 is connected to a rectifier bridge 26 in which four diodes are present (27, 28, 29 and 30). The other side of the rectifier bridge 26 is connected to the supply terminal 21. The central branch of the rectifier bridge 26 includes a transistor 31 and a resistor 32. The base of the transistor 31 and also the terminals of the resistor 32 are connected to a control device 33 which is fed from the same supply terminals through the conductors 34 and 35.

Broadly, the arrangement of FIG. 2 operates in the same manner as that of FIG. 1, however, with the difference that in the arrangement of FIG. 2 a supply voltage having an alternating voltage character is used, whereas in FIG. 1 a direct voltage supply is used. In the relevant case the inductance of the coil 25 was approximately 2.7 mH, the ignition voltage of the lamp 22 was approximately 260 Volts and the operating voltage of this lamp followed the instantaneous value of the AC supply voltage (within given limits) in the conducting condition of the transistor. The re-ignition voltage of this lamp also varied, namely between 200 and approximately 250 Volts. The mean current intensity in the lamp 22 was equal in one direction to that in the other direction, namely 0.5 amperes on average.

Figure 3:
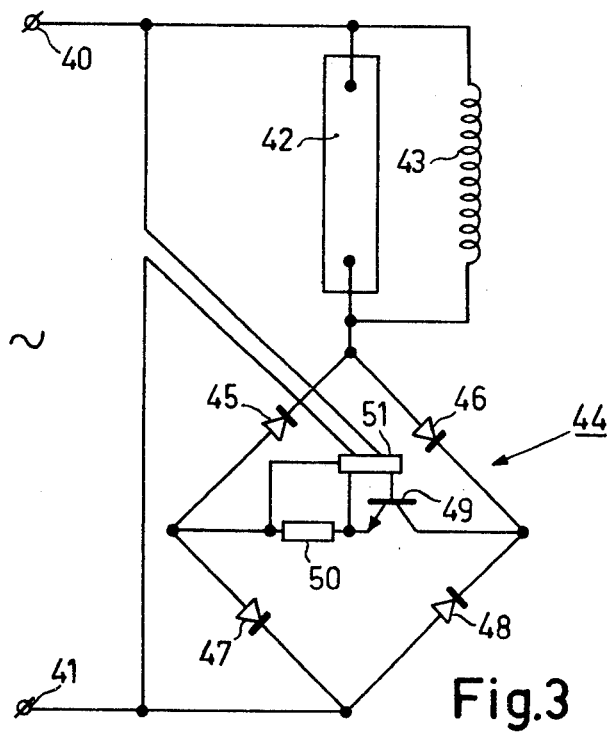
FIG. 3 shows an electric circuit diagram of a third arrangement according to the invention.

Finally FIG. 3 shows a supply circuit using two input terminals 40 and 41 for connection to an AC supply of 220 Volts, 50 Hz. Terminal 40 is connected to a high-pressure mercury vapour discharge lamp 42 which is provided with halides. The lamp 42 is shunted by an inductor 43. There is also a rectifier bridge 44 which can be compared with bridge 26 of FIG. 2. The rectifier bridge 44 is provided with four diodes 45 to 48 inclusive. A transistor 49 is connected in the central branch of the bridge 44 in series with a resistor 50 in this central branch. The base of transistor 49 and the terminals of resistor 50 are connected to a control device 51 for the transistor 49. In the relevant case the ignition voltage of the lamp 42 was approximately 300 Volts and the operating voltage of this lamp again followed the AC supply voltage in the conducting condition of the transistor, and the reignition voltage likewise varied. The transistor 49 was driven at a mean frequency of 30 kHz and the ratio between the operative period and the inoperative period of this transistor was approximately 1 to 10.

An advantage of the three circuits described is that cataphoresis or an irregular attack of the lamp electrodes did not occur and that the lamps were ignited in a simple manner.

What is claimed is:

1. An arrangement for energizing an electric discharge lamp having a pair of electrodes for defining a current path through the lamp comprising, a pair of input terminals for supplying an operating voltage to said arrangement, a controlled switching element connected in series circuit with the lamp across said input terminals of the arrangement, a control device coupled to a control electrode of the switching element for switching the switching element on and off at a minimum frequency of 400 times per second, an inductor connected in a branch circuit in parallel with said lamp so that currents flow in parallel through the lamp and the inductor in the operative condition of the lamp and with the switching element conductive, and means responsive to the cut off of current in the switching element for generating a voltage across the lamp which is at least equal to the re-ignition voltage of said lamp.

2. An arrangement as claimed in claim 1 wherein the inductor comprises the means for generating the voltage for the re-ignition of the lamp, the combination of the value of the inductance L of said inductor and of the current variation $di/dt$ of the current i through said inductor at the moment the switching element becomes cut off being chosen so that the product L. $di/dt$ is at least equal to said lamp re-ignition voltage.

3. An arrangement as claimed in claim 2, wherein said input terminals are adapted for connection to a direct voltage supply, the inductance of the inductor being chosen so that the value of the product of the conductivity period of the switching element and the mean lamp current during said conductivity period is between 0.8 times and 1.2 times the value of the product of the off-time of the switching element and the mean lamp current during said off-time.

4. An arrangement as claimed in claim 2 in which the lamp comprises a low-pressure mercury vapour discharge lamp provided with two preheated electrodes and the inductor connects the ends of the electrodes remote from the input terminals.

5. An arrangement as claimed in claim 2, wherein the switching element comprises a transistor.

6. An arrangement as claimed in claim 2 wherein said input terminals are adapted for connection to an alternating voltage supply of approximately 40 to 60 Hz, characterized in that the switching element includes a rectifier bridge having a central branch including a transistor.

7. An arrangement as claimed in claim 2 wherein said input terminals are adapted to be connected to a voltage supply whose voltage is lower than the ignition voltage of the lamp, characterized in that the inductance of the inductor and the value of $di/dt$ is chosen so that with the supply voltage applied to the input terminals of the arrangement but with the lamp not yet ignited the voltage generated in the inductor becomes at least equal to the ignition voltage of the lamp when the switching element is cut off.

8. Apparatus for energizing an electric discharge lamp comprising, a pair of input terminals for connection to a source of supply voltage, a controlled switching element connected in series circuit with the lamp across said input terminals, means coupled to a control electrode of the switching element for switching the switching element on and off at a frequency substantially higher than the supply voltage frequency, and an inductor connected in parallel with the lamp whereby currents flow in parallel through the lamp and the inductor in the operative condition of the lamp and with the switching element conductive, said inductor being chosen to generate a voltage which is at least equal to the lamp reignition voltage when the switching element is cut off and of a polarity to drive a current through the lamp in a direction opposite to that which flowed in the lamp during the conductive period of the switching element.

9. Apparatus as claimed in claim 8 wherein the input terminals are adapted to be connected to a source of DC voltage and said switching means drives the switching element with a duty cycle such that the average ratio between the on and off time of the switching element is 3 to 5.

10. Apparatus as claimed in claim 8 wherein the input terminals are adapted to be connected to a source of DC voltage and the frequency of said switching means and the inductance of said inductor are chosen so that the product of the on-time lamp current and the on-time of the switching element is approximately equal to the product of the off-time lamp current and the switching element off-time.

11. Apparatus as claimed in claim 8 wherein the input terminals are adapted to be connected to a source of DC voltage and further comprising means directly connecting the inductor to the terminals of the lamp so that the DC supply current can flow in parallel through the lamp and the inductor during the on-time of the switching element.

12. Apparatus as claimed in claim 8 further comprising means responsive to the current flow through the switching element for deriving a control voltage proportional thereto, and means for applying said control voltage to said switching means whereby the switching means adjusts the duty cycle of said switching element as a function of the control voltage so as to maintain the lamp current approximately constant.

13. Apparatus as claimed in claim 8 wherein the lamp includes a pair of preheated electrodes connected to the inductor so that the inductor provides a path for current flow from the input terminals through the preheated electrodes and the switching element during the period prior to the ignition of the lamp.

14. Apparatus as claimed in claim 8 further comprising means directly connecting the inductor to the terminals of the lamp so that a DC supply current can flow in parallel through the lamp and the inductor during the on-time of the switching element, and the inductor is substantially free of magnetic coupling to other inductors.

* * * * *